United States Patent [19]

Miyasaka

[11] Patent Number: 4,918,676
[45] Date of Patent: Apr. 17, 1990

[54] TRACK ACCESSING APPARATUS FOR OPTICAL DISK

[75] Inventor: Toshiyuki Miyasaka, Yokohama, Japan

[73] Assignee: Kabushiki Kaisha Toshiba, Kawasaki, Japan

[21] Appl. No.: 226,308

[22] Filed: Jul. 29, 1988

[30] Foreign Application Priority Data

Jul. 31, 1987 [JP] Japan .................. 62-191585

[51] Int. Cl.$^4$ .............................. G11B 7/00
[52] U.S. Cl. ......................... 369/32; 369/33; 369/44; 360/78.04
[58] Field of Search ........ 369/32, 33, 43–47; 358/342, 907; 360/77.01, 77.02, 77.03, 78.01, 78.04

[56] References Cited

U.S. PATENT DOCUMENTS

| | | | |
|---|---|---|---|
| 4,106,058 | 8/1978 | Romeas et al. | 369/32 |
| 4,149,201 | 4/1979 | Card | 360/77.08 |
| 4,375,091 | 2/1983 | Dakin et al. | 369/32 |
| 4,390,912 | 6/1983 | Hertrich et al. | 360/78.07 |
| 4,819,219 | 4/1989 | Nagano | 369/44 X |

FOREIGN PATENT DOCUMENTS

0088537 9/1983 European Pat. Off. .
2718092 11/1977 Fed. Rep. of Germany .
59-16348 4/1984 Japan .

*Primary Examiner*—Robert L. Richardson
*Attorney, Agent, or Firm*—Finnegan, Henderson, Farabow, Garrett and Dunner

[57] ABSTRACT

In order to access to a destination track, a CPU compares a present track number and a destination track number to derive out the track difference and the transfer direction of an objective lens in an optical head. Then, it derives out the sum of transfer time and processing time and determines whether or not sector "0" is passed during the total period of time. If it is determined that sector "0" is passed and when the objective lens is transferred inwardly of an optical disk, the number of tracks obtained by adding one to the track difference is supplied to a tracking controller. Then, the tracking controller drives a driving coil according to the received number of tracks so as to set the objective lens to the destination track. Further, if it is determined that sector "0" is passed and when the objective lens is transferred outwardly of the optical disk, the number of tracks obtained by subtracting one from the track difference is supplied to the tracking controller. Then, the tracking controller drives the driving coil according to the received number of tracks so as to set the objective lens to the destination track.

16 Claims, 5 Drawing Sheets

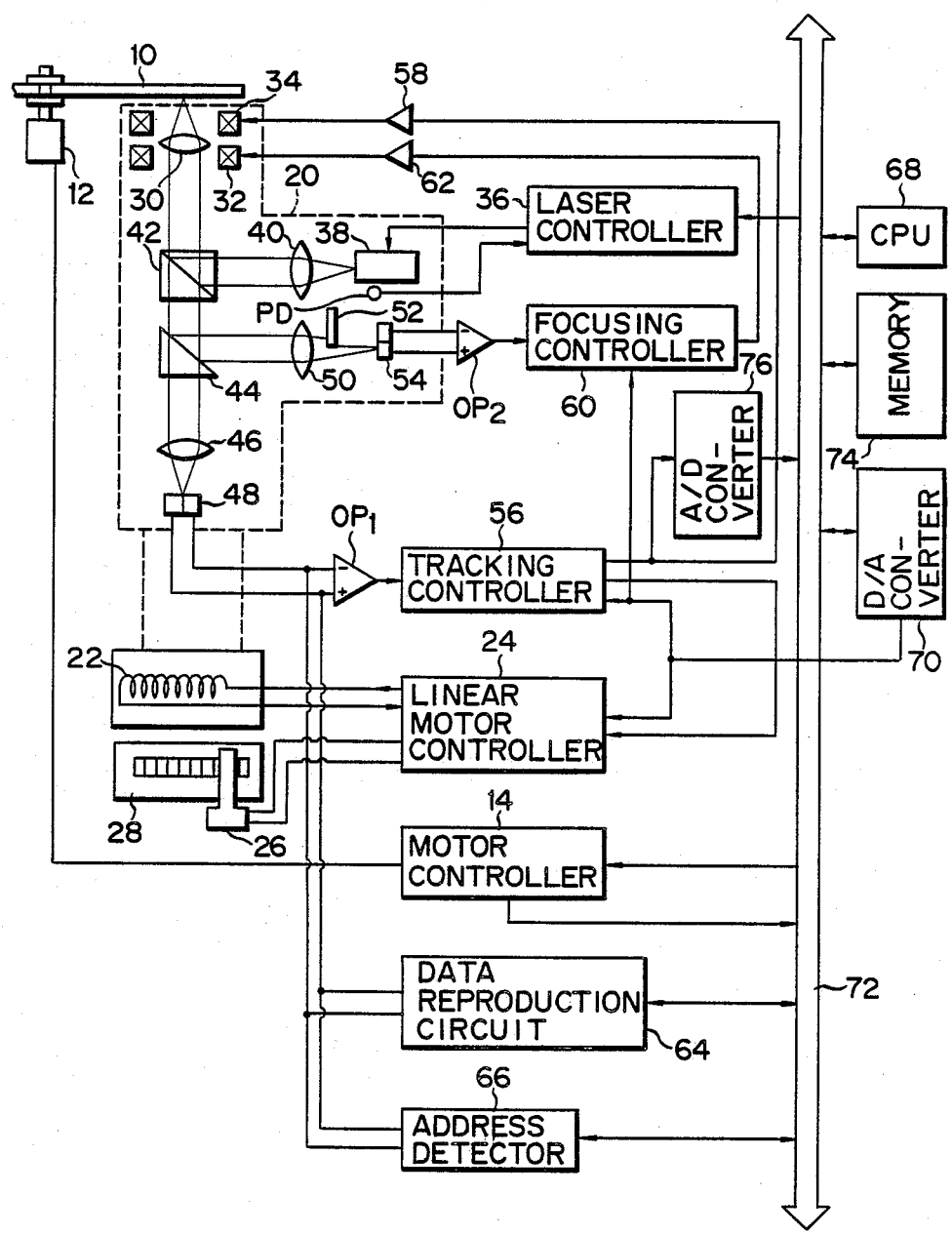
F I G. 1

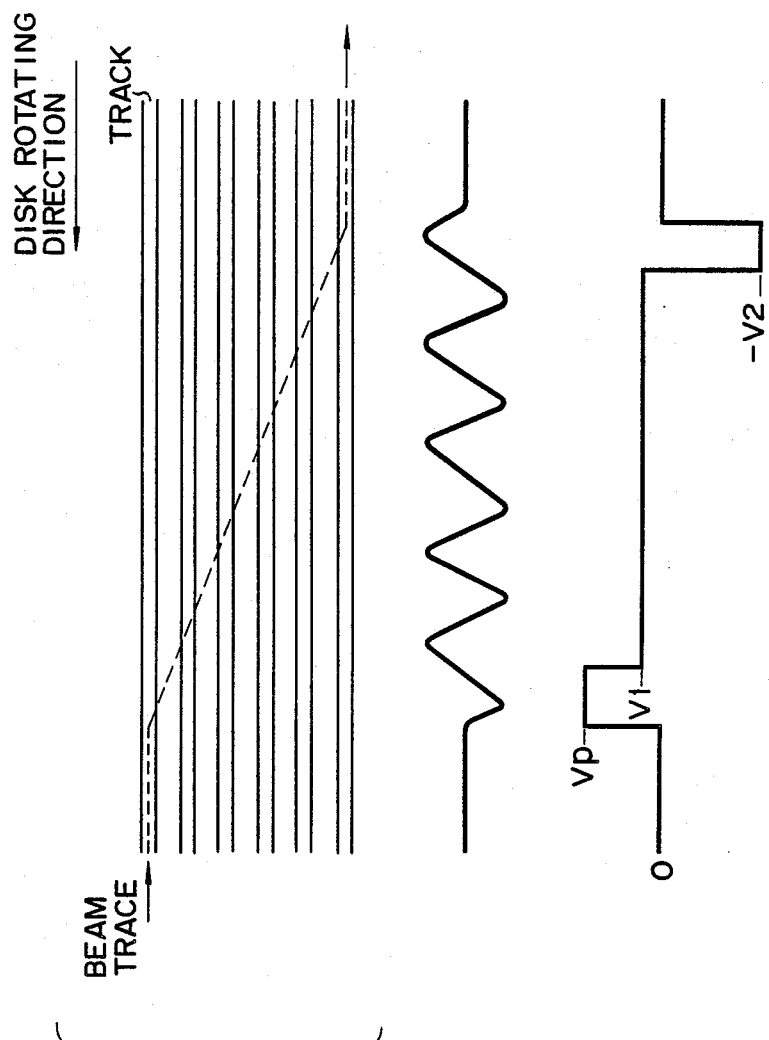

TRACK ACCESSING APPARATUS FOR OPTICAL DISK

BACKGROUND OF THE INVENTION

1. Field of the Invention

This invention relates to a disk apparatus for recording data on or reproducing data from an optical disk, for example.

2. Description of the Related Art

As is well known in the art, various disk drive apparatuses are developed. As one of such disk apparatuses, an optical disk apparatus for recording data on an optical disk and reproducing the data from the optical disk is provided, for example. An example of such optical disk apparatus is that disclosed in U.S. Pat. No. 4,641,294. The optical disk apparatus records data on the optical disk, and reads out the data recorded on the optical disk by a laser light generated from a semiconductor laser in an optical head.

The access control for such an optical disk apparatus is disclosed, for example, in U.S. Pat. No. 4,375,091. To perform the access operation, a linear motor is first driven, thus moving an optical head, thus effecting a rough access. Then, a track on the optical disk is read by means of the optical head thus roughly accessed, and a difference between the detected track and a destination track is determined. At this time, if the difference between the accessed track and the destination track is small, an objective lens is moved by means of an objective lens driving mechanism to effect fine access. However, if the difference is large, the linear motor is driven again to move the optical disk so as to effect rough access. Thus, the optical disk apparatus controls access to the destination track.

The optical disk used in the optical disk apparatus has recording tracks (recording grooves) which are provided in the form of concentric circles, or recording tracks which are formed as a recording groove in a spiral form. In the optical disk having the recording tracks arranged in the form of concentric circles, each recording track is used as the same track or one track. In contrast, in the optical disk having the recording tracks arranged in the spiral form, there is no physical boundary between the tracks, and therefore each track segment corresponding to one rotation of the optical disk is used as an address for locating data, that is, the track segment of one rotation starting from sector "0" is used as the same track or one track for efficient access. Therefore, the access operation in this type of optical disk is effected by simply moving the objective lens by a difference between the detected track number and the destination track number.

However, in the optical disk having the recording tracks of the spiral form, useless access operation may be effected and the access time may be unnecessarily made long. That is, the optical disk has the following problems.

(1) In a case where a currently accessed track lies outside and adjacent to the destination track and the objective lens is moved by one track inwardly, the optical disk will rotate during the time of the one-track movement. In this case, if the objective lens has passed sector "0", it will be set on the same track as that on which it was set before the movement, and therefore it is necessary to move the objective lens again.

(2) In contrast, in a case where a currently accessed track lies inside and adjacent to the destination track and the objective lens is moved by one track outwardly, the optical disk will rotate during the time of the one-track movement. In this case, if the objective lens passes sector "0", it will apparently move outwardly by two tracks, and therefore it becomes necessary to move it inwardly by one track.

In the two cases described above, when sector "0" is passed, it is required to effect an extra access operation, and thus the access time is made longer.

SUMMARY OF THE INVENTION

An object of this invention is to provide a disk apparatus which can effect an access operation in an optical disk having recording tracks arranged in a spiral form without causing extra access operation and making the access time longer.

According to one aspect of this invention, there is provided a disk apparatus for focusing a light beam onto a disk, the disk having a plurality of spiral tracks for guiding the light beam and a standard portion defining a starting end of each track, the tracks having a first track and a second track located on the inner side of the first track, the disk apparatus comprising means for rotating the disk, means for directing the light beam onto the disk rotated by the rotating means, means for detecting a position where the light beam is directed by the directing means, means for moving the light beam directed by the directing means from the first track toward the second track, first calculating means for calculating a number of tracks between the first track and the second track, second calculating means for calculating a number of the tracks corresponding to the pass times the standard portion of any track during the light beam moves from the first track toward the second track in accordance with the directing position of the light beam, a rotating speed of the disk rotated by the rotating means, and the number of the tracks calculated by the first calculating means, means for adding the number of the tracks calculated by the first calculating means and the number of the tracks calculated by the second calculating means, and means for adjusting the light beam moved by the moving means on the second track in accordance with the number of the tracks added by the adding means.

According to another aspect of this invention, there is provided a disk apparatus for focusing a light beam onto a disk, the disk having a plurality of spiral tracks for guiding the light beam and a standard portion defining a starting end of each track, the tracks having a first track and a second track located on the outer side of the first track, the disk apparatus comprising means for rotating the disk, means for directing the light beam onto the disk rotated by the rotating means, means for detecting a position where the light beam is directed by the directing means, means for moving the light beam directed by the directing means from the first track toward the second track, first calculating means for calculating a number of tracks between the first track and the second track, second calculating means for calculating a number of the tracks corresponding to the pass times the standard portion of any track during the light beam moves from the first track toward the second track in accordance with the directing position of the light beam, a rotating speed of the disk rotated by the rotating means, and the number of the tracks calculated by the first calculating means, means for subtracting the number of the tracks calculated by the second calculating means from the number of the tracks calculated by the first calculating means, and means for adjusting the light beam moved by the moving means on the second track in accordance with the number of the tracks subtracted by the subtracting means.

BRIEF DESCRIPTION OF THE DRAWINGS

FIG. 1 is a constructional view of an optical disk apparatus according to one embodiment of this invention;

FIG. 4A to 4C are diagrams explaining how multi-jump is carried out.

DETAILED DESCRIPTION OF THE PREFERRED EMBODIMENTS

There will now be described an embodiment of this invention with reference to the accompanying drawings.

FIG. 1 shows an optical disk apparatus according to one embodiment of this invention. Recording tracks are formed as a groove in the spiral form on the surface of optical disk 10. Optical disk 10 is rotated at a constant speed, for example, by means of motor 12 which is controlled by motor control circuit 14.

Figure 2:
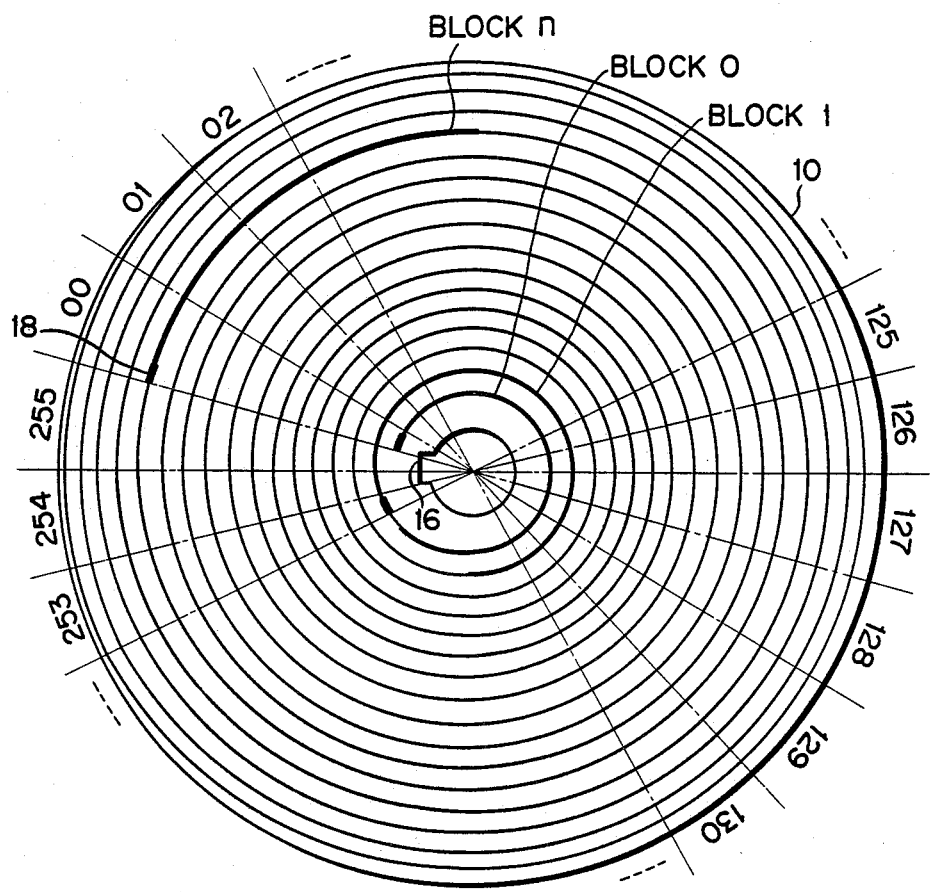
FIG. 2 is a diagram showing the construction of an optical disk.

Optical disk 10 is formed of a disk of glass, plastics or the like on which a metal coating film or recording film of tellurium or bismuth is formed. As is shown in FIG. 2, reference mark 16 formed of a notch is provided near the center of the metal coating film on optical disk 10.

The recording surface or the optical disk is divided into 256 sectors of the same size, i.e., sector "0" to sector "255". Reference mark 16 is put to the first sector "0", as is shown in FIG. 2. Each recording/reproduction unit is called a block, and a fixed length of data is recorded for each block. Variable length of data can be recorded by using a plurality of blocks. For example, 300,000 blocks are provided in 36,000 tracks formed on optical disk 10.

The number of sectors occupied by each block on optical disk 10 is 40 in the inner portion and 20 in the outer portion, for example. Block header 18 including a block number, a track number and like is recorded in the head portion of each block at the time of manufacturing optical disk 10, for example. In a case where the block does not terminate at the boundary between adjacent sectors, a block gap is provided so as to start each block at the boundary between the sectors.

There is no physical boundary between the tracks, and therefore each track segment corresponding to one rotation of the optical disk is used as an address for locating data, or the track segment starting from sector "0" and terminating at sector "255" is used as the same track or one track for efficient access.

Operations of recording and reproducing data on optical disk 10 are effected by means of optical head (focusing means) 20 as is shown in FIG. 1. Optical head 20 is fixed on driving coil 22 constituting a movable portion of the linear motor. Driving coil 22 is connected to linear motor controller 24 which is also connected to linear motor position detector 26. Linear motor position detector 26 generates a position signal by detecting the graduation on optical scale 28 mounted on optical head 20. A permanent magnet (not shown) is mounted on the fixed portion of the linear motor. When driving coil 22 is excited by means of linear motor controller 24, optical head 20 is driven in a radial direction of optical disk 10.

As is shown in FIG. 1, optical head 20 includes objective lens 30, driving coils 32, 34, semiconductor laser 38, collimator lens 40, half prisms 42, 44, condenser lenses 46, 50, tracking position sensors 48, knife edge 52, and focus sensors 54. Objective lens 30 is held in optical head 20 by means of wires or leaf springs (not shown). Objective leans 30 is driven in a focusing direction (in a direction of the optical axis of the lens) by means of driving coil 32 and driven in a tracking direction (in a direction perpendicular to the optical axis of the lens) by means of driving coil 34.

A laser light generated from semiconductor laser 38 which is excited by laser controller 36 is applied to optical disk 10 via collimator lens 40, half prism 42 and objective lens 30. The reflected light from optical disk 10 is directed to half prism 44 via objective lens 30 and half prism 42, and divided by half prism 44 into two components. One of the divided components is directed to a pair of tracking position sensors 48 via condenser lens 46, and the other component is directed to a pair of focus sensors 54 via condenser lens 50 and knife edge 52.

Output signals from tracking sensors 48 are supplied to differential amplifier OP1 which in turn produces an output signal to tracking controller 56. A track difference signal from tracking controller 56 is supplied to linear motor controller 24 and to driving coil 34 via amplifier 58. Focus position sensors 54 generate signals which represent the focused point of the laser light and which are supplied to amplifier OP2 and then to focusing controller 60. An output signal from focusing controller 60 is supplied to focusing driving coil 32 via amplifier 62, and is thus used to precisely focus the laser light on optical disk 10.

As described above, the sum of output signals of tracking position sensors 48 subjected to the focusing and tracking operations represents the presence or absence of pits (recording data). The signal is supplied to data reproduction circuit 64 which reproduces recorded data such as image data and audio data. Likewise, the sum of output signals of tracking position sensors 48 is supplied to address detector 66 which reproduces address data (track number, sector number and the like).

Tracking controller 56 drives objective lens 30 in response to a tracking jump signal supplied from CPU 68 via D/A converter 70. As a result of this, the laser beam spot is moved to the next track. This movement of the beam spot, from one track to another, will be called "track jump", which is described in detail in U.S. Pat. Re. No. 29,963.

Motor controller 14, linear motor controller 24, laser controller 36, tracking controller 56, focusing controller 60, data reproduction circuit 64 and address detector 66 are controlled by means of CPU 68 via bus lines 72. CPU 68 executes a predetermined operation according to the program stored in memory 74. Data transfer between CPU 68 and each of linear motor controller 24, tracking controller 56 and focusing controller 60 is effected by way of D/A converter 70 and A/D converter 76.

Figure 3A:
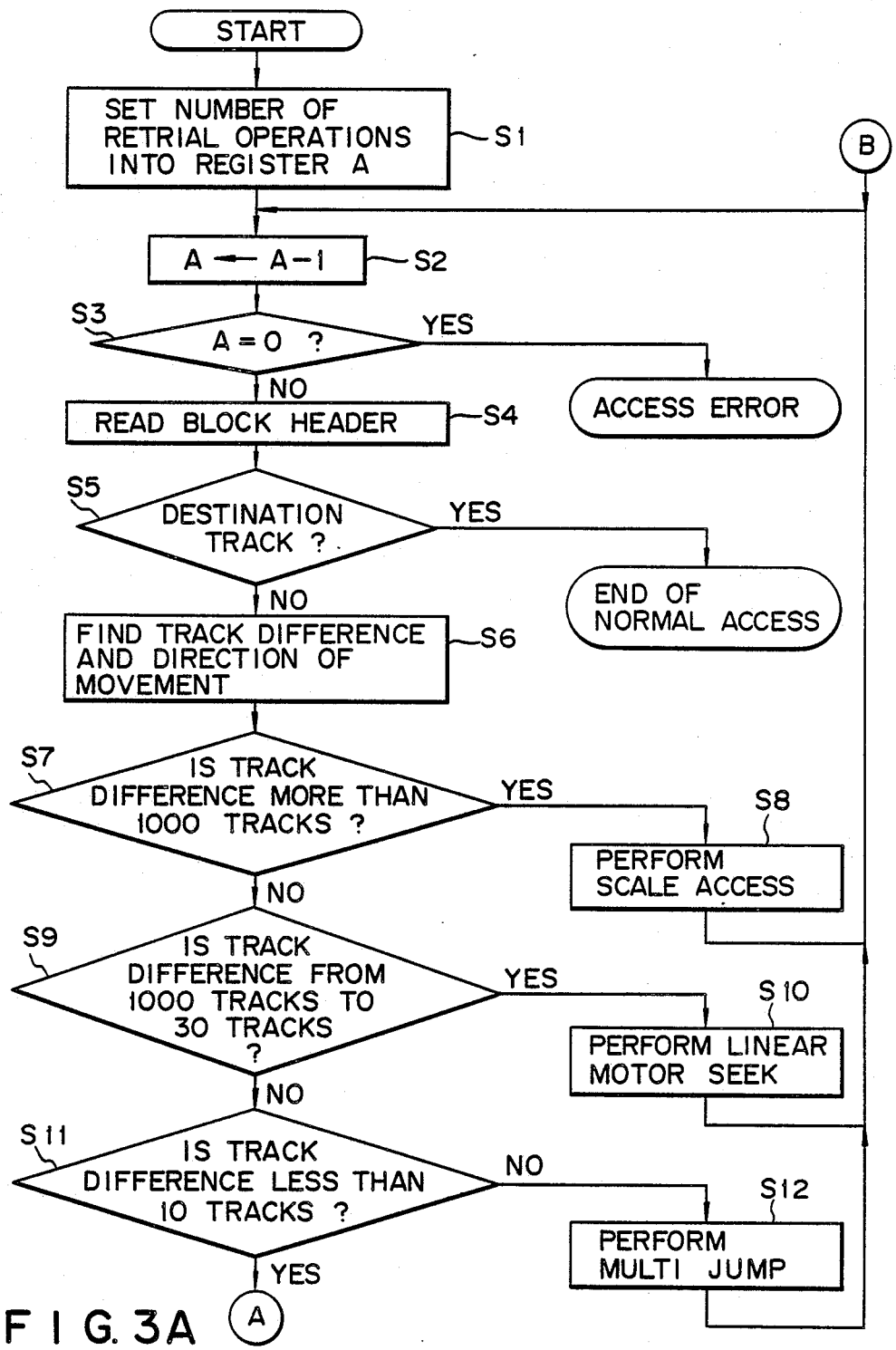
FIGS. 3A and 3B are flowcharts showing the access operation.
Figure 3B:
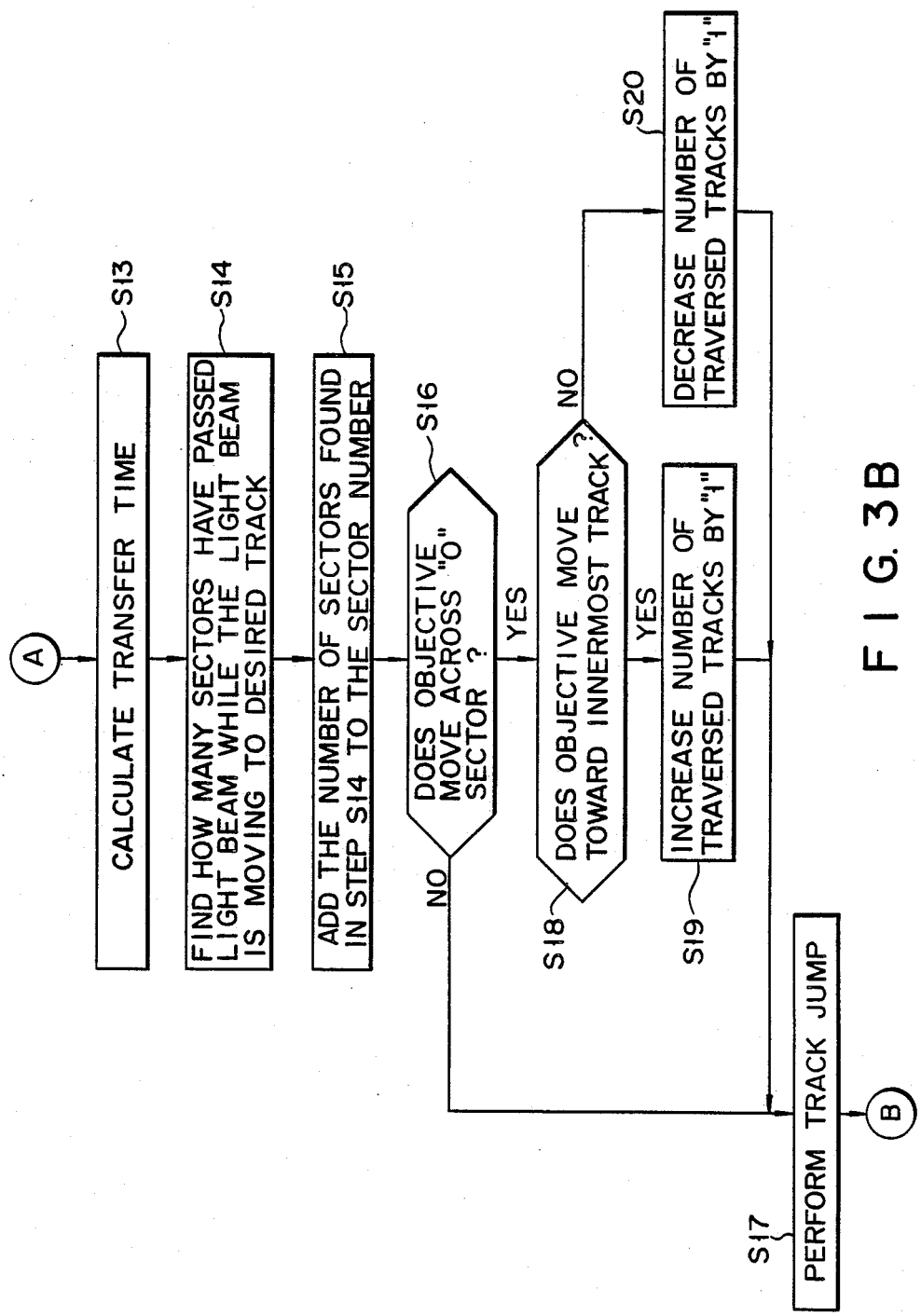

Now, the access operation is explained with reference to the flowcharts shown in FIGS. 3A and 3B. Assume now that a track number for access operation is supplied to CPU 68 from an external device (not shown). Then, CPU 68 derives out, based on the received track number, a track number and a starting sector number of a track to be accessed with reference to a table (not shown).

CPU 68 sets a given retrial number into internal register A (not shown) because the destination track cannot always be accessed by a single access operation (step S1). First, CPU 68 reduces the retrial number set in the register A by "1" (step S2) and starts the access operation. At this time, if the retrial number is set to "0", it determines that the retrial is terminated (step S3) and it is determined as an access error.

If an error has not occurred, then CPU 68 determines the current position based on the track number and sector number (that is, the contents of the block header of the track to which the laser beam from optical head 20 is now applied) which is supplied from address detector 66 as address information (step S4). In this case, if the track which optical head 20 faces or to which the laser beam is applied corresponds to the destination track (step S5), then the access operation is normally terminated.

If there is a difference between the track which optical head 20 faces and the destination track, CPU 68 derives out the difference (the number of tracks) between the current track and the destination track and the transfer direction (inwardly or outwardly) (step S6). It is then determined whether or not the difference is more than 1000 tracks (step S7). If YES, scale access is carried out (step S8). More specifically, CPU 68 calculates the scale value equal to the difference, and supplies this scale value to linear motor controller 24 via D/A converter 70. Linear motor controller 24 has obtained, from the position signal output by linear motor position detector 26, the data showing the position of optical head 20 and also the data representing the speed of optical head 20. In accordance with these data items and the scale value supplied from CPU 68. Linear motor controller 24 controls driving coil 22, thereby moving optical head 20 to the track defined by the scale value. The maximum tolerance of this scale access is about ±100 tracks. Upon completion of this scale access, the operation returns to step S2.

If NO in step S7, it is determined whether or not the difference is from 30 to 1000 tracks (step S9). If YES, linear-motor seek operation is effected (step S10). That is, CPU 68 calculates the scale value equivalent to the difference, and outputs this scale value to linear motor controller 24 via D/A converter 70. In the meantime, tracking controller 56 detects how many times the signal output by tracking position sensors 48 fluctuates as optical head 20 is moved. Controller 56 outputs the data, which represents the number of times the signal has fluctuated, to linear motor controller 24. Controller 24 obtains, from the position signal output by position detector 26, the data representing the speed at which optical head 20 has been moved. It obtains also the data showing the position of head 20, from the data supplied from tracking controller 56. In accordance with the speed data and the position data, controller 24 controls driving coil 22, thereby moving optical head 20 to the track defined by the scale value. The maximum tolerance of this linear-motor seek operation is about ±10 tracks. Upon completion of this linear-motor seek operation, the operation returns to step S2.

If NO in step S9, it is determined whether or not the difference is less than 10 tracks (step S11). If NO, that is, the difference ranges from 10 to 30, multi-jump is performed (step S12). More specifically, in step S12, CPU 68 outputs the data representing the difference, to tracking controller 56 via D/A converter 70. Tracking controller 56 detects how many times the signal output by tracking position sensors 48 fluctuates. (Each fluctuations takes place when the beam spot moves from one track to another, as is shown in FIG. 4A, while optical head 20 is being moved. Every time head 20 moves across one track, signal output by sensors 48 fluctuates as is shown in FIG. 4B). From this number of times, the number of the tracks which head 20 has moved across is calculated. Controller 56 generates pulse signal as is shown in FIG. 4C, and supplies to driving coil 34, whereby objective lens 30 is moved, thus moving the beam spot across the tracks the number of which is equal to the difference supplied from CPU 68. The maximum tolerance of the multi-jump operation is approximately ±1 track. Upon completion of the multi-jump operation, the operation returns to step S2.

If YES in step S11, that is, the difference is less than 10 tracks, then CPU 68 calculates the transfer time (step S13). The transfer time can calculate as follows:

(transfer time for one track)×(the number of tracks derived in step S6)+[operation or processing time (fixed)].

Assuming that the transfer time for one track, i.e., the time required to move the beam spot from one track to the immediately next track, is 5 miliseconds, and that the number of tracks determined in step S6 is six, then the time which inrequired to move objective lens 30 across six tracks is:

$$(5 \text{ ms} \times 6) + 3 \text{ ms} = 33 \text{ ms},$$

where 3 ms is the processing time (fixed).

In step S14, it will be calculated how many sectors passes the beam spot during the period of time calculated in step S13, as the disk is rotated. That is, the following calculation is performed in step S14:

(period found in S14)÷(period one sector passes the spot)

The period one sector passes the beam spot depends upon the speed of rotation of the disk. Assuming that the disk rotates at the speed of 600 rpm, then it takes each sector 0.39 miliseconds to pass the beam spot. Hence; the number of sectors to be calculated in step S14, in the above-mentioned instance, will be:

$$33 \text{ ms} \div 0.39 \text{ ms} = 84.6$$

Thereafter, CPU 68 adds the number of sectors obtained in step S14 to the sector number which has been determined (step S15). From the sum thus obtained, CPU 68 determines whether or not the "0" sector has passed the beam spot (step S16). If the sector number is "28" the sum obtained in step S15 is "113". Since the sum is less than "255", it is determined that the "0" sector has not passed the beam spot. If the sector number is "188", the sum obtained in step S15 is "273", which is greater than "255". In this case, it is determined that the "0" sector has passed the beam spot. If it is determined that sector "0" is not passed, CPU 68 performs a track jump of the number of tracks obtained in step S6 (step S17).

That is, CPU 68 outputs the data representing the number of tracks calculated in step S6. This data is input to tracking controller 56 via D/A converter 70. In accordance with this data, controller 56 controls driving coil 34, thereby move objective lens 30 such that the beam spot moves across the same number of tracks, one track after another. As a result of this, the beam spot is placed on the desired track.

In step S14, if it is determined that sector "0" is passed, CPU 68 adjusts the number of tracks to be actually crossed or traversed according to the transfer direction. That is, it is first determined whether the transfer direction is an inward or outward direction (step S18), the number of tracks is increased by "1" when the transfer direction is an inward direction (step S19), and the number of tracks is decreased by "1" when the transfer direction in an outward direction (step S20). After this, CPU 68 performs a track jump of the number of tracks obtained as the adjustment result (step S17).

Thus, CPU 68 supplies the number tracks adjusted in step S17 or S18 to tracking controller 56 via D/A converter 70. Then, tracking controller 56 drives driving coil 34 according to the received number of tracks so as to set objective lens 30 to a desired track. That is, fine access is effected by a track-jump operation (the operation of jumping tracks one by one).

After the track-jump operation, step S2 is effected again, and it is determined by reading out the contents of block header 18 whether or not the current track is a destination track.

As described above, in a case where an inward access operation is effected, the actual transfer distance is increased by one track if sector "0" is passed during the sum of the transfer time and processing time. Therefore, the apparent transfer distance can be prevented from being decreased by one track. Further, in a case where an outward access operation is effected, the actual transfer distance is reduced by one track if sector "0" is passed during the transfer time and processing time. Therefore, the apparent transfer distance can be prevented from being increased by one track. Thus, a waste of access time occurring in the prior art can be eliminated and the access time can be reduced.

In the embodiment described above, address detector 66 which reads out the contents of block header 18 of the track currently specified by a laser beam from optical head 20 to detect the current sector number is used as sector detecting means for detecting a current sector number. However, it is not limited to this type of sector detecting means. For example, it is possible to detect the current sector number by detecting the amount of rotation of motor 12 after reference mark 16 of optical disk 10 has been detected. That is, various methods can be used in this invention if the current sector number can be detected.

In the embodiment described above, each track of the optical disk corresponds to one rotation of the optical disk, starting from sector "0". Nonetheless, according to the present invention, each track can correspond to several rotation of the optical disk, also starting from sector "0".

In the foregoing it has been described that the beam spot moves across first sector "0" only once. If the beam spot moves across sector "0" two or more times, the number of tracks is added or reduced by the times the spot moves across this sector "0".

Further, in the above embodiment, the optical disk apparatus using the optical disk is explained, but it is not limited to this type of apparatus, and this invention can be applied to various types of disk apparatuses such as a magnetic disk apparatus using a magnetic disk.

What is claimed is:

1. A disk apparatus for focusing a light beam onto a disk, the disk having a plurality of spiral tracks for guiding the light beam and a standard portion defining a starting end of each track, the tracks having a first track and a second track located on the inner side of the first track, said disk apparatus comprising:

means for rotating the disk;
   means for directing the light beam onto the disk rotated by said rotating means;
   means for detecting a position where the light beam is directed by said directing means;
   means for moving the light beam directed by said directing means from the first track toward the second track;
   first calculating means for calculating a number of tracks between the first track and the second track;
   second calculating means for calculating a number of the tracks corresponding to the pass times the standard portion of any track during the light beam moves from the first track toward the second track in accordance with the directing position of the light beam, a rotating speed of the disk rotated by said rotating means, and the number of the tracks calculated by said first calculating means;
   means for adding the number of the tracks calculated by said first calculating means and the number of the tracks calculated by said second calculating means; and
   means for adjusting the light beam moved by said moving means on the second track in accordance with the number of the tracks added by said adding means.

2. The disk apparatus according to claim 1, wherein said second calculating means calculates the number of the tracks in accordance with the directing position of the light beam, the rotating speed of the disk, the number of the tracks calculated by said first calculating means, a calculation time during which said first and second calculating means have calculated the numbers of the tracks, and a moving time during which said moving means has moved the light beam.

3. The disk apparatus according to claim 1, wherein said directing means includes light source means for emitting the light beam, and focusing means for focusing the light beam onto the disk, and said moving means includes means for moving said focusing means in the radial direction of the disk.

4. The disk apparatus according to claim 1, wherein each track of the disk begins at a start position in the standard portion of the disk and ends at an end position which corresponds to a start position of an adjacent track.

5. The disk apparatus according to claim 1, further comprising:

optical head means which includes said directing means and moving means;
   head-moving means for moving said optical head means in a radial direction of the disk;
   judging means for determining whether or not the number of the tracks calculated by said first calculating means is greater than a predetermined number; and
   means for driving said head-moving means when said judging means determines that the number of the tracks is greater than the predetermined number, such that said head-moving means moves said optical head means by a distance corresponding to the number of the tracks calculated by said first calculating means toward the second track.

6. The disk apparatus according to claim 5, further comprising control means for controlling the adding means and the adjusting means so as to operate only when said judging means determines that the number of the tracks is not greater than the predetermined number.

7. The disk apparatus according to claim 1, wherein said adjusting means includes:
means for counting the number of the tracks which the light beam has moved across; and
means for controlling said moving means so as to move the light beam until the number of the tracks counted by the count means changes to the number equivalent to the number of the tracks obtained by said adding means.

8. The disk apparatus according to claim 1, wherein said adjusting means includes means for controlling said moving means so as to move the light beam across a number of the tracks, one after another, which is equivalent to the number of the tracks obtained by said adding means.

9. A disk apparatus for focusing a light beam onto a disk, the disk having a plurality of spiral tracks for guiding the light beam and a standard portion defining a starting end of each track, the tracks having a first track and a second track located on the outer side of the first track, said disk apparatus comprising:
means for rotating the disk;
means for directing the light beam onto the disk rotated by said rotating means;
means for detecting a position where the light beam is directed by said directing means;
means for moving the light beam directed by said directing means from the first track toward the second track;
first calculating means for calculating a number of tracks between the first track and the second track;
second calculating means for calculating a number of the tracks corresponding to the pass times the standard portion of any track during the light beam moves from the first track toward the second track in accordance with the directing position of the light beam, a rotating speed of the disk rotated by said rotating means, and the number of the tracks calculated by said first calculating means;
means for subtracting the number of the tracks calculated by said second calculating means from the number of the tracks calculated by said first calculating means; and
means for adjusting the light beam moved by said moving means on the second track in accordance with the number of the tracks subtracted by said subtracting means.

10. The disk apparatus according to claim 9, wherein said second calculating means calculates the number of the tracks in accordance with the directing position of the light beam, the rotating speed of the disk, the number of the tracks calculated by said first calculating means, a calculation time during which said first and second calculation means have calculated the numbers of the tracks, and a moving time during which said moving means has moved the light beam.

11. The disk apparatus according to claim 9, wherein said directing means includes light source means for emitting the light beam, and focusing means for focusing the light beam onto the disk, and said moving means includes means for moving said focusing means in the radial direction of the disk.

12. The disk apparatus according to claim 9, wherein each track of the disk begins at a start position in the standard portion of the disk and ends at an end position which corresponds to a start position of an adjacent track.

13. The disk apparatus according to claim 9, further comprising:
optical head means which includes said directing means and moving means;
head-moving means for moving said optical head means in a radial direction of the disk;
judging means for determining whether or not the number of the tracks calculated by said first calculating means is greater than a predetermined number; and
means for driving said head-moving means when said judging means determines that the number of the tracks is greater than the predetermined number, such that said head-moving means moves said optical head means by a distance corresponding to the number of the tracks calculated by said first calculating means toward the second track.

14. The disk apparatus according to claim 13, further comprising control means for controlling the subtracting means and the adjusting means so as to operate only when said judging means determines that the number of the tracks is not greater than the predetermined number.

15. The disk apparatus according to claim 9, wherein said adjusting means includes:
means for counting the number of the tracks which the light beam has moved across; and
means for controlling said moving means so as to move the light beam until the number of the tracks counted by the count means changes to the number equivalent to the number of the tracks obtained by said subtracting means.

16. The disk apparatus according to claim 9, wherein said adjusting means includes means for controlling said moving means so as to move the light beam across a number of the tracks, one after another, which is equivalent to the number of the tracks obtained by said subtracting means.

* * * * *